US006374844B1

(12) United States Patent
Hall

(10) Patent No.: US 6,374,844 B1
(45) Date of Patent: Apr. 23, 2002

(54) METHOD IN OPERATING A CAVERN FOR GAS

(75) Inventor: Ola Hall, Lund (SE)

(73) Assignees: Gaz de France, Saint-Denis Cedex (FR); Sydkraft AB, Malmo (SE)

( * ) Notice: Subject to any disclaimer, the term of this patent is extended or adjusted under 35 U.S.C. 154(b) by 0 days.

(21) Appl. No.: 09/637,967

(22) Filed: Aug. 11, 2000

Related U.S. Application Data

(63) Continuation of application No. PCT/SE99/00192, filed on Feb. 15, 1999.

(30) Foreign Application Priority Data

Feb. 13, 1998 (SE) ............................................. 9800423

(51) Int. Cl.7 ............................ B65G 5/00; E21F 17/16

(52) U.S. Cl. ........................ 137/1; 137/236.1; 137/563; 62/53.1

(58) Field of Search ............................. 137/236.1, 563, 137/1; 62/53.1

(56) References Cited

U.S. PATENT DOCUMENTS

| | | | | | |
|---|---|---|---|---|---|
| 3,661,424 | A | * | 5/1972 | Jacoby | 299/4 |
| 4,224,800 | A | * | 9/1980 | Grennard | 62/45 |
| 4,593,202 | A | * | 6/1986 | Dickinson | 290/54 |
| 4,858,640 | A | * | 8/1989 | Kaufman | 137/236.1 |
| 5,937,906 | A | * | 8/1999 | Kozyuk | 138/37 |

FOREIGN PATENT DOCUMENTS

| | | |
|---|---|---|
| CH | 616124 | 3/1980 |
| EP | 0377405 A1 | 7/1990 |
| FR | 2551531 | 3/1985 |
| GB | 1521816 | 8/1979 |

* cited by examiner

*Primary Examiner*—Kevin Lee
(74) *Attorney, Agent, or Firm*—Luedeka, Neely & Graham, Esq.

(57) ABSTRACT

The invention relates to a method in operating a lined cavern provided for the storage of gas coming from a pipeline. During filling of the cavern with gas to a nominal pressure, at least a portion of the gas is withdrawn from the cavern and recirculated to the cavern under cooling and without substantial compression. The method also includes recirculating the gas under heating and without substantial compression.

6 Claims, 3 Drawing Sheets

METHOD IN OPERATING A CAVERN FOR GAS

This application is a continuation of international application No. PCT/SE99/00192, filed Feb. 15, 1999 (status, abandoned, pending, etc.).

BACKGROUND OF THE INVENTION

The present invention relates to a method in operating a cavern for gas.

There is a need for intermediate storage of gas, such as natural gas, which is distributed via pipelines from sources of natural gas, e.g. with a view to managing the distribution during peak use of pipelines.

Intermediate storage of natural gas under pressure is already known. Deep-seated (about 1000–2000 m below ground level), unlined aquifers and salt formations have been used as storage. Lined caverns (LRC, Lined Rock Cavern) at a little depth (100–150 m below ground level) have also been disclosed, see e.g. FI-69503, where the natural gas is stored at a high pressure (150 bar) and at a temperature of ±0° C. to ±6° C., that is in the form of gas.

The lining of caverns has been described as consisting of a sandwich construction, see e.g. FI-69503 and "Demo Plant for Lined Gas Stores at Grängesberg. Deeper Analysis of the Test Results", TRITA-AMI Report 3004 (1995), the common denominator of these documents being a gas-tight layer (steel, plastic) on the inside and a support layer (concrete) on the outside, in which latter drainage pipes are embedded, among other things, for the drainage of water. The thickness of the support layer is selected in consideration of, for instance, the desired temperature insulation capacity.

If a lined cavern is to be filled with natural gas from a pipeline, the natural gas is compressed to the nominal working pressure of the cavern, the quantity of natural gas storable in the cavern at the maximum permissible pressure being limited by a temperature corresponding to this pressure after the compression.

It is desirable to be able to increase the quantity of stored gas, such as natural gas, at a certain pressure (maximum permissible pressure) in a cavern.

SUMMARY OF THE INVENTION

The object of the invention is to satisfy these requirements, which is achieved by one embodiment of the invention described herein.

Another object of the invention is to reduce the risks of damage to the lining due to repeated freezing and low temperatures, and this object is achieved by according to a further embodiment of the invention described herein. As a result, it is also possible to save costs by reducing the thickness of the lining of newly constructed caverns.

BRIEF DESCRIPTION OF THE DRAWINGS

The invention will now be further described with reference to the accompanying drawings.

DETAILED DESCRIPTION OF THE DRAWINGS

Figure 1:
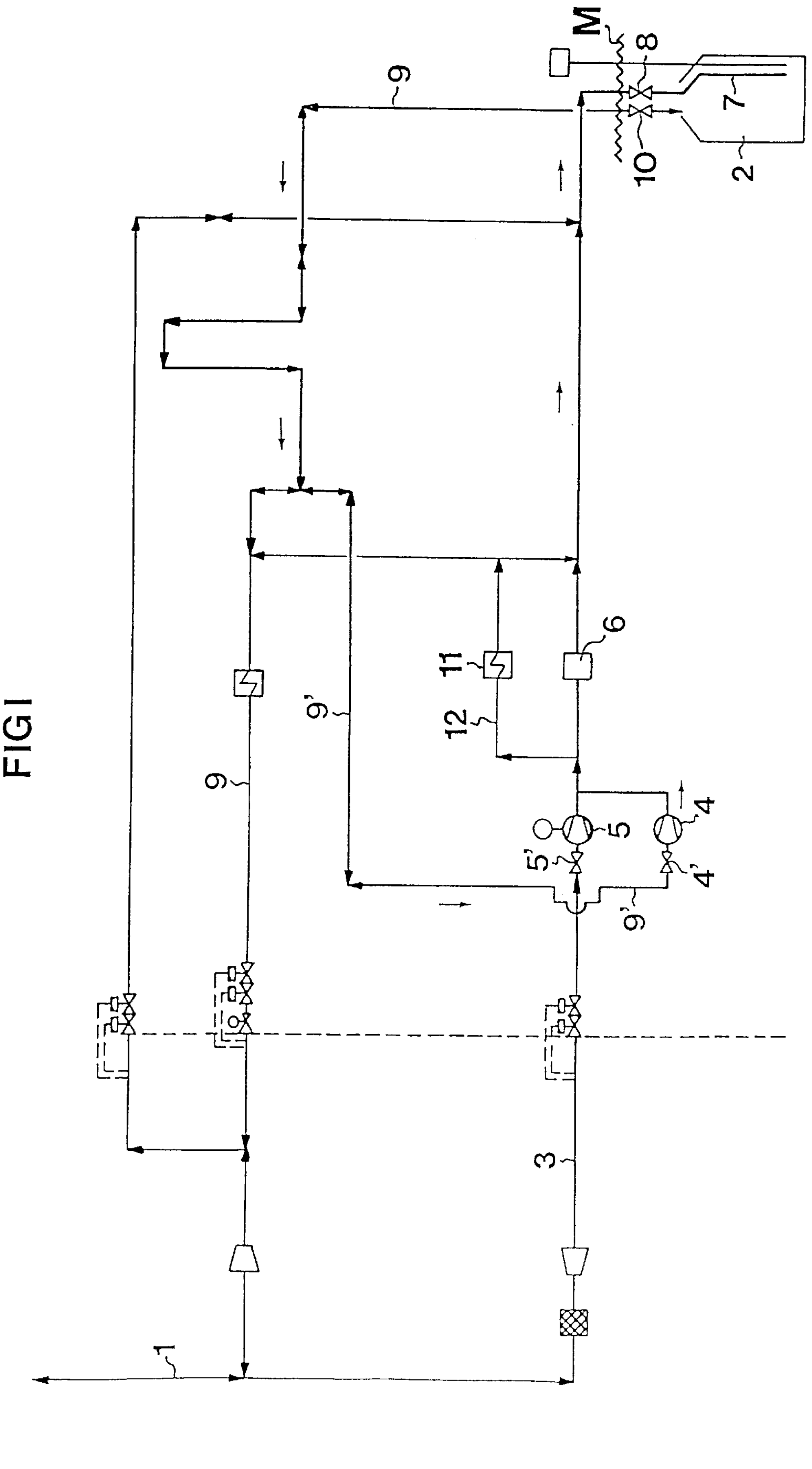
FIG. 1 is a skeleton diagram of an installation for carrying out the method, this skeleton diagram also constituting a flow diagram for the operation in filling mode.

The installation has the following components which are essential for the understanding of the invention:

A pipeline or main pipe 1 for natural gas, a lined cavern 2, an injection pipe 3 connecting the main pipe to the cavern, compressors 4 and 5, a cooler 6, in the pipe 3, an inlet pipe 7 to the cavern, which pipe preferably extends the injection pipe 3 to the bottom of the cavern 2 and comprises an on-off valve 8, an outlet pipe 9 with a recirculation branch 9' and with an on-off valve 10, and a heater 11, which is connected in a pipe 12 bypassing the cooler 6. The recirculation pipe 9' is connected to the injection pipe 3 on the suction side of the compressor 5. On-off valves in the injection pipe 3 and the recirculation branch 9' have reference numerals 4' and 5'.

The ground level is designated M. The cavern may have a prior-art construction (cf. the introductory part of the description).

The installation is operated in the following manner when carrying out the inventive method.

1) Filling of the cavern with natural gas from the main pipe 1, see FIG. 1:

The valve 8 being open, natural gas is withdrawn from the main pipe 1 (at a pressure of e.g. 30 bar) and compressed in the compressor 5 (the valve 5' open), whereupon it is cooled in the cooler 6 and injected into the cavern 2. As a result, the pressure of the natural gas increases and hence the temperature in the cavern. To increase the effective volume or the quantity of natural gas which is to be stored in the cavern, the valve 10 is opened, the valve 4' is opened and warm natural gas is withdrawn from the cavern and recirculated through the pipes 9, 9', the compressor 4 and the cooler 6 to the cavern 2. The compressor 4 is provided for compression substantially only to compensate for the pressure drop in the injection pipe 3 between the compressor 4 and the cavern 2, that is it performs no substantial compression of the natural gas.

Figure 3:
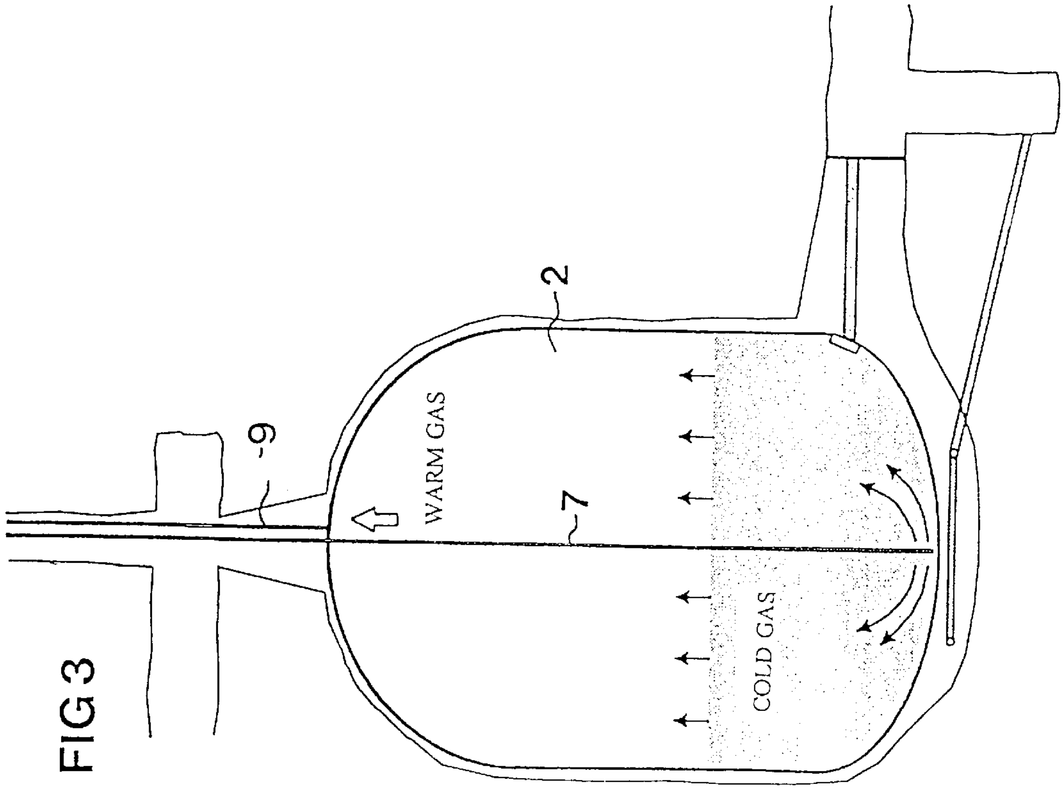
FIG. 3 shows the cavern in recirculation mode during filling.

As already mentioned, the inlet pipe 7 preferably extends to the bottom of the cavern 2, so that the cooled recirculated natural gas presses the warmer natural gas lying above to be recirculated and cooled, see FIG. 3.

Figure 2:
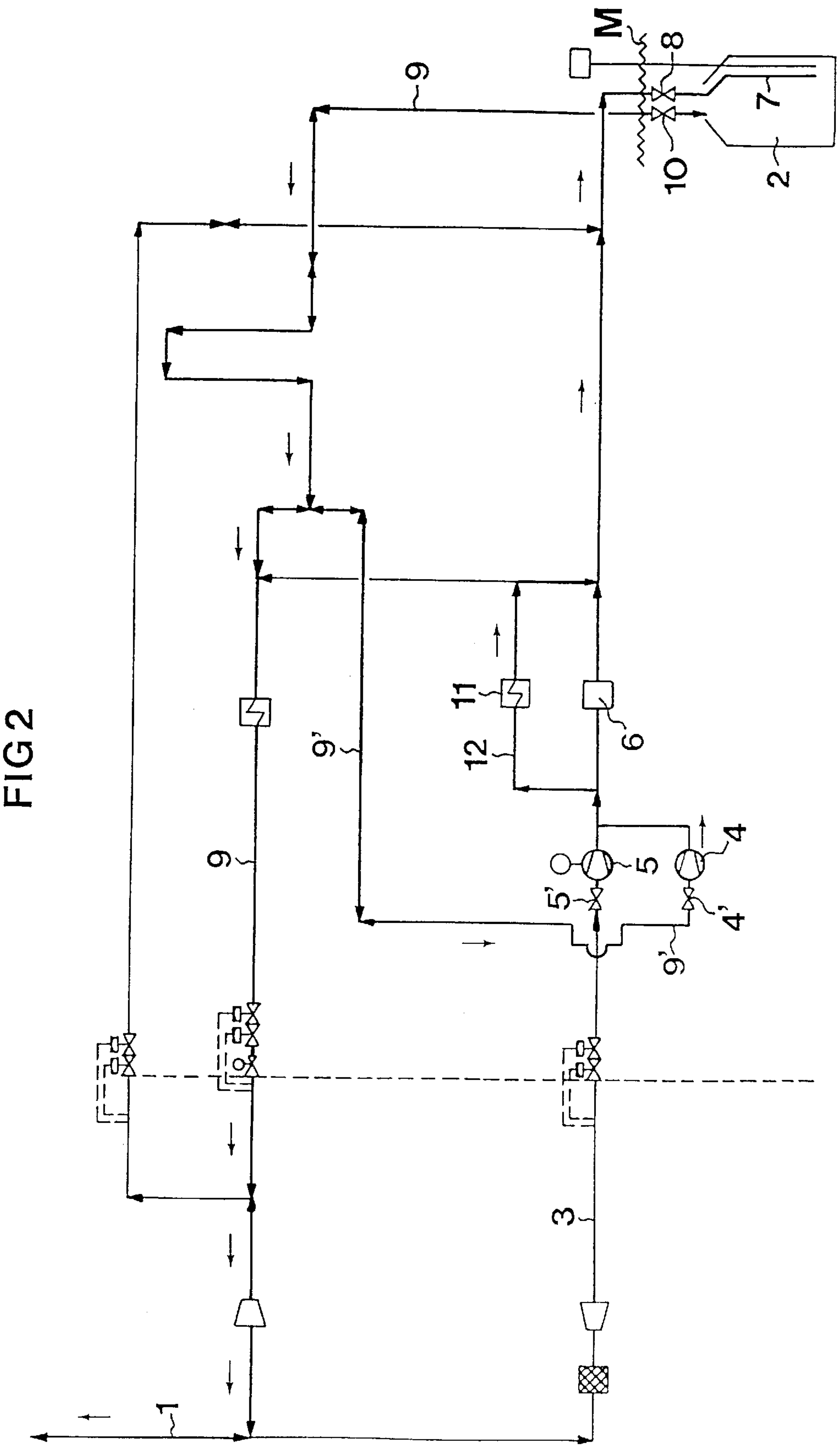
FIG. 2 is the same skeleton diagram, but a flow diagram for the operation in withdrawal mode.
Figure 4:
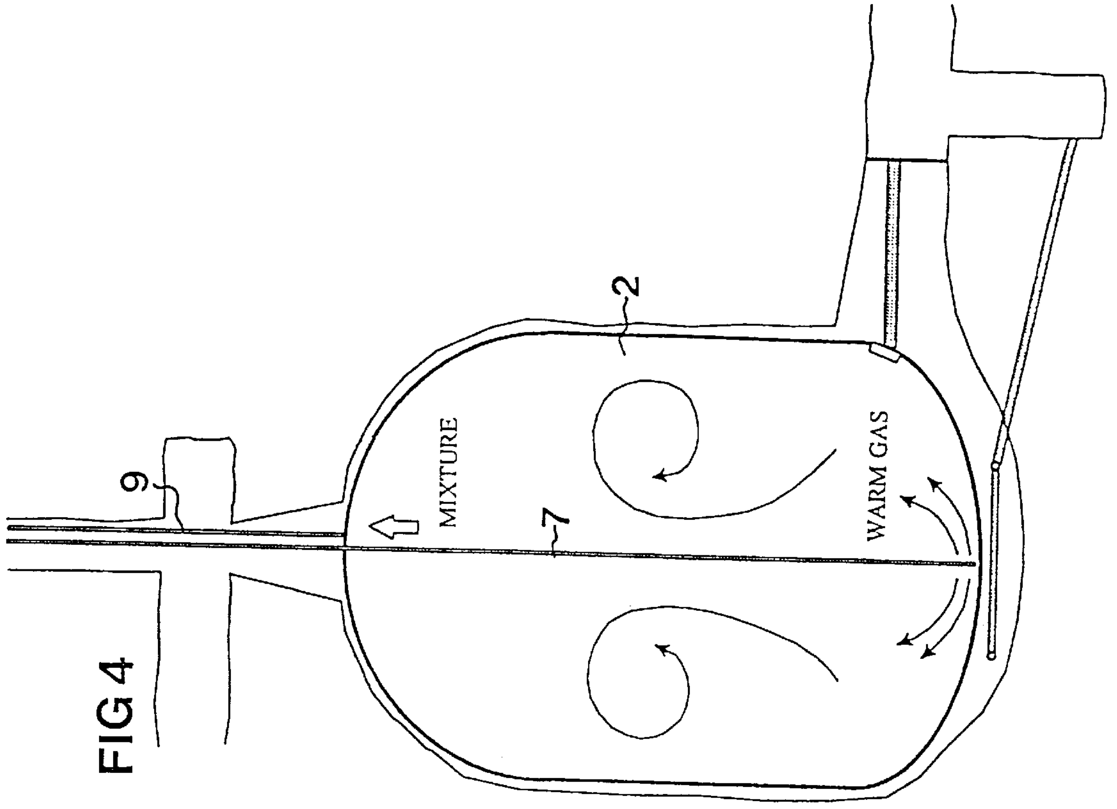
FIG. 4 shows the cavern in recirculation mode during withdrawal.

2) A method of withdrawing natural gas from the cavern to the main pipe 1, see FIG. 2:

For this purpose, the valve 10 is opened. During the withdrawal, the temperature decreases, thus increasing the demands placed on the lining material. There is an increasing risk of gas hydrate forming and of alternating freezing and thawing of the cavern lining. To reduce or eliminate this risk and to eliminate said increase of demands, the valve 8 is also opened and a portion of the withdrawn natural gas is recirculated to the cavern 2 via the compressor 4 (the valve 5' closed and the valve 4' open) and the bypass-pipe 12 with the heater 11 heating the natural gas. This portion is introduced into the cavern at the bottom via the injection pipe 7. Since this portion is warmer and hence lighter at the bottom than at the top, it will rise and blend with the top content. It then absorbs water and hydrocarbons which may have accumulated at the bottom of the cavern and also contributes to a more efficient discharge from the cavern, see FIG. 4.

The compressors 4, 5 can, of course, be replaced with one single compressor for both filling and recirculation in sequence. Thus, the compressor 4 and the valve 4', for instance, are eliminated and the recirculation branch 9' is connected to the injection pipe 3 upstream of the valve 4. When the nominal working pressure of the cavern 2 of about 200 bar has been attained, the injection of natural gas is terminated. The valve 10 is then opened for recirculation of natural gas via the valve 5' and the compressor 5. When the temperature of the natural gas in the cavern 2 has been decreased in this manner, with the ensuing pressure drop in the cavern, the filling of the cavern with natural gas can be resumed until the nominal working pressure (about 200 bar) has been attained once more in the cavern. In the withdrawal of gas from the cavern both valves 10 and 8 are opened. A portion of the withdrawn gas is recirculated through the compressor 5 and the heater 11 to the cavern 2.

The cooler 6 can be arranged at the bottom of the cavern 2. It is implied above that the natural gas is stored and processed in the form of gas.

What is claimed is:

1. A method of operating a lined cavern for the storage of gas which enters the cavern from a pipeline in a gaseous state, which comprises filling the cavern with the gas to a nominal pressure, withdrawing at least a portion of the gas from the cavern and recirculating it to the cavern under cooling and without substantially compressing the gas.

2. A method according to claim 1, wherein said filling and recirculation are performed at the same time.

3. A method according to claim 1, wherein said filling and recirculation are performed sequentially.

4. A method according to claim 1, wherein the recirculated gas portion is introduced into the cavern at the bottom thereof, and the gas portion for recirculation is withdrawn at the top of the cavern.

5. A method of operating a lined cavern for the storage of gas which enters the cavern from a pipeline in a gaseous state which comprises withdrawing gas from the cavern into a pipeline, withdrawing at least a portion of the gas from the cavern, before the pipeline, and recirculating it to the cavern under heating and without substantially compressing the gas.

6. A method according to claim 2, wherein said recirculated gas portion is introduced into the cavern at the bottom thereof.

* * * * *

UNITED STATES PATENT AND TRADEMARK OFFICE

CERTIFICATE OF CORRECTION

PATENT NO. : 6,374,844 B1
DATED : April 23, 2002
INVENTOR(S) : Ola Hall

It is certified that error appears in the above-identified patent and that said Letters Patent is hereby corrected as shown below:

Title page,
ABSTRACT, please delete the ABSTRACT in its entirety, and insert therefor:

-- The invention relates to a method in operating a lined cavern provided for the storage of gas, such as natural gas,coming from a pipeline, in the form of gas. During filling of the cavern with gas to a nominal pressure, at least a portion of the gas is withdrawn from the cavern and recirculated to the cavern under cooling and without substantial compression. The invention also relates to a method in operating a lined cavern provided for the storage of gas, such as natural gas, coming from a pipeline, in the form of gas. In the withdrawal of gas from the cavern for introduction into the pipeline, a portion of the withdrawn gas is, before the pipeline, recirculated to the cavern under heating and without substantial compression. --

Column 4,
Line 16, after "claim", delete "2" and insert therefore -- 5 --.

Signed and Sealed this

Fifth Day of November, 2002

*Attest:*

JAMES E. ROGAN

*Attesting Officer*

*Director of the United States Patent and Trademark Office*